(12) United States Patent
Pleasants et al.

(10) Patent No.: US 9,938,828 B2
(45) Date of Patent: *Apr. 10, 2018

(54) MOBILE CONVEYOR DEVICE FOR THE DELIVERY OF TUNNEL LINERS

(71) Applicant: RELINE AMERICA, INC., Clarksburg, MD (US)

(72) Inventors: David Samuel Pleasants, Monrovia, MD (US); William Donald Pleasants, Jr., Boyds, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 15/601,197

(22) Filed: May 22, 2017

(65) Prior Publication Data
US 2017/0254203 A1    Sep. 7, 2017

Related U.S. Application Data

(63) Continuation of application No. 14/994,473, filed on Jan. 13, 2016, now Pat. No. 9,695,689.

(60) Provisional application No. 62/103,336, filed on Jan. 14, 2015.

(51) Int. Cl.
| | |
|---|---|
| *E21D 11/00* | (2006.01) |
| *E21D 11/40* | (2006.01) |
| *E21D 5/00* | (2006.01) |
| *F16L 55/165* | (2006.01) |
| *B29C 63/34* | (2006.01) |

(52) U.S. Cl.
CPC .............. *E21D 11/406* (2016.01); *E21D 5/00* (2013.01); *F16L 55/1651* (2013.01); *B29C 63/34* (2013.01)

(58) Field of Classification Search
CPC .... E21D 11/40; E21D 11/406; F16L 55/1652; F16L 55/1651; E03F 2003/065
See application file for complete search history.

(56) References Cited

U.S. PATENT DOCUMENTS

| | | |
|---|---|---|
| 715,620 A | 12/1902 | Staude |
| 733,700 A | 7/1903 | Cohen |
| 1,659,585 A | 2/1928 | Adams |
| 2,819,657 A | 1/1958 | Hammerstrom |
| 3,566,756 A | 3/1971 | Schmid et al. |
| 4,009,063 A | 2/1977 | Wood |
| 4,207,130 A | 6/1980 | Barber |
| 4,668,125 A | 5/1987 | Long, Jr. |
| 4,685,983 A | 8/1987 | Long, Jr. |
| 4,776,370 A | 10/1988 | Long, Jr. |
| 5,725,328 A | 3/1998 | Schmager |
| 5,906,789 A | 5/1999 | Kamiyama et al. |
| 6,938,860 B2 * | 9/2005 | Singleton .................. B65F 1/00 141/390 |
| 7,476,348 B2 | 1/2009 | Waring |
| 9,086,183 B2 | 7/2015 | Fyfe |
| 2007/0074774 A1 | 4/2007 | Chandler |

(Continued)

*Primary Examiner* — Benjamin F Fiorello
(74) *Attorney, Agent, or Firm* — Welsh Flaxman & Gitler LLC

(57) ABSTRACT

A system for folding and deploying liners within tunnels includes a mobile conveyor device having a base frame including a plurality of wheels supporting a support frame. The mobile conveyor device also includes a folding assembly mounted upon the support frame at a position adjacent a first end of the base frame and a conveyor assembly mounted upon the support frame at a position adjacent a second end of the base frame.

2 Claims, 18 Drawing Sheets

(56) References Cited

U.S. PATENT DOCUMENTS

2014/0215799 A1    8/2014   Tanner
2015/0328857 A1   11/2015   Ueda et al.

* cited by examiner

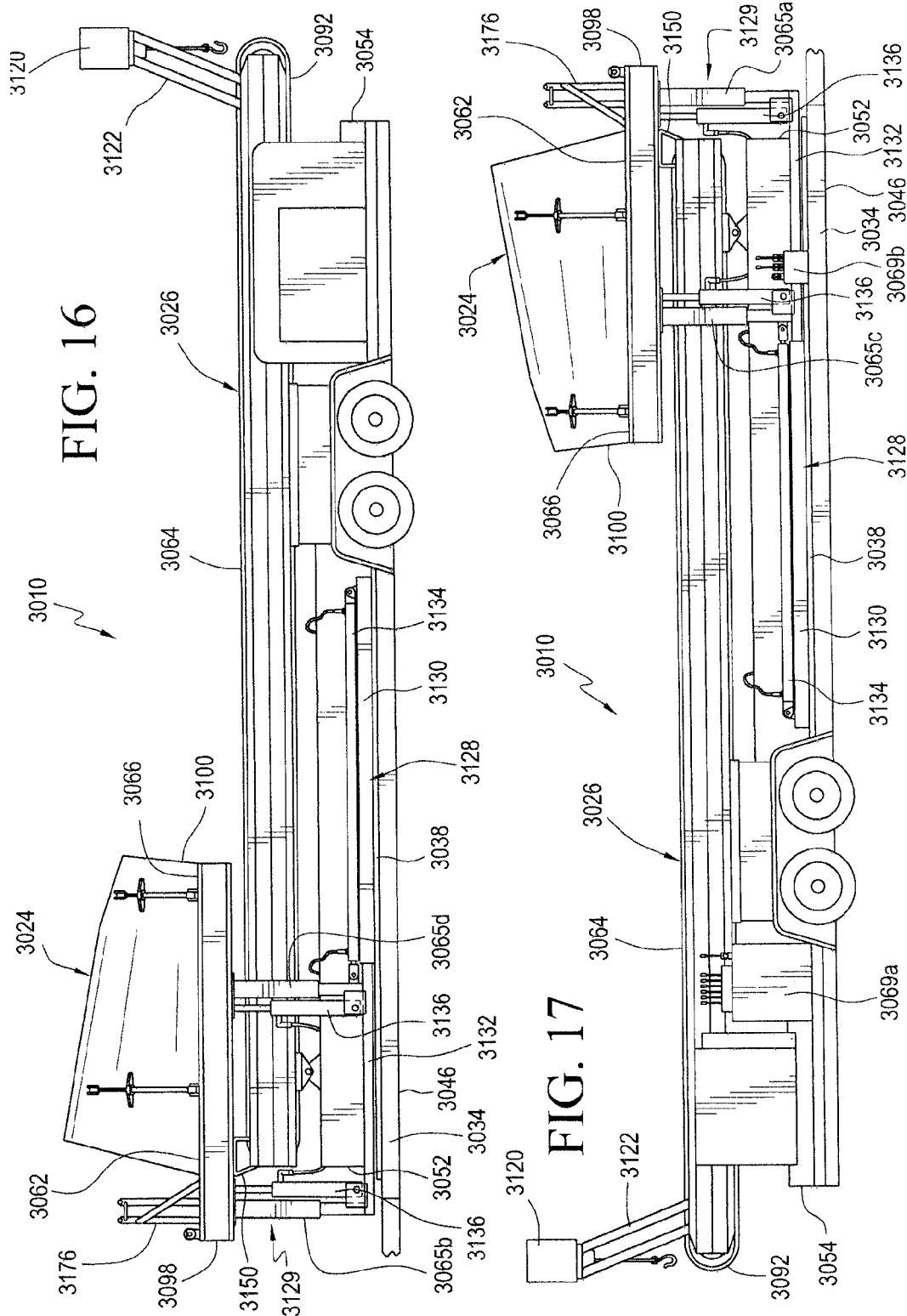

MOBILE CONVEYOR DEVICE FOR THE DELIVERY OF TUNNEL LINERS

CROSS REFERENCE TO RELATED APPLICATION

This application is a continuation of U.S. patent application Ser. No. 14/994,473, filed Jan. 13, 2016, entitled "MOBILE CONVEYOR DEVICE FOR THE DELIVERY OF TUNNEL LINERS", which is currently pending, which claims the benefit of U.S. Provisional Application Ser. No. 62/103,336, entitled "MOBILE CONVEYOR DEVICE FOR THE DELIVERY OF TUNNEL LINERS," filed Jan. 14, 2015.

BACKGROUND OF THE INVENTION

1. Field of the Invention

The present invention relates to a mobile conveyor device for the delivery of tunnel liners. In particular, the invention relates to a system for the mobile delivery of folded tunnel liners.

2. Description of the Related Art

The process for delivery of liners for tunnels is often cumbersome and the liners themselves are very heavy, thus requiring a variety of complicated and time-consuming steps. It is appreciated that the term "tunnel" encompasses a variety of structures and as such should be understood to refer to horizontal utility lines, manholes, inlets, pipes, tubes, utility entrances, other utility structures, etc. that lead to underground utility lines. The process can be further complicated when environmental conditions make it difficult to deliver the liners. As such, a need exists for a convenient, reliable, and efficient system for the delivery of liners for deployment in tunnels.

SUMMARY OF THE INVENTION

It is, therefore, an object of the present invention to provide a system for the deployment and folding of liners within tunnels. The system includes a mobile conveyor device having a base frame with a plurality of wheels supporting a support frame. A folding assembly is mounted upon the support frame at a position adjacent a first end of the base frame and a conveyor assembly is mounted upon the support frame at a position adjacent a second end of the base frame.

It is also an object of the present invention to provide a system including a liner crate.

It is another object of the present invention to provide a system including a funnel.

It is a further object of the present invention to provide a system wherein the folding assembly includes first and second folding members shaped and dimensioned to fold a liner upon itself prior to utility opening insertion.

It is also an object of the present invention to provide a system wherein the first and second folding members are wave-like, arcuate members.

It is another object of the present invention to provide a system wherein the conveyor assembly is pivotable relative to the support frame to provide for adjustable tilting of the conveyor assembly.

It is a further object of the present invention to provide a system wherein the conveyor assembly includes a belt conveyor.

It is another object of the present invention to provide a system including a guide member at a first end of the support frame for feeding the liner into the folding assembly.

It is a further object of the present invention to provide a system wherein the folding assembly includes an elevated platform mounted upon the support frame for movement between a storage orientation where the elevated platform is positioned over the support frame and a use orientation where the elevated platform extends beyond the first end of the support frame.

It is also an object of the present invention to provide a system wherein the folding assembly includes a linear slide assembly that selectively moves the elevated platform along the longitudinal axis of the support frame between the storage orientation and the use orientation.

It is another object of the present invention to provide a system wherein the folding assembly includes a vertical lifting mechanism for controlled vertical movement of the elevated platform relative to the support frame.

It is a further object of the present invention to provide a system wherein the conveyor assembly extends the entire length of the support frame, and the elevated platform sits above a portion of the conveyor assembly when it is in its storage position.

It is also an object of the present invention to provide a system wherein, when the folding assembly is in its use orientation, the elevated platform is moved beyond the end of the conveyor assembly such that the entirety of the conveyor assembly is exposed.

It is another object of the present invention to provide a system wherein the support frame supports a winch above the second end of the conveyor assembly for attachment of the winch to the liner so as to pull the liner.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 16 and 17 are side views of the embodiment shown in FIG. 13.

DESCRIPTION OF THE PREFERRED EMBODIMENTS

Figure 1:
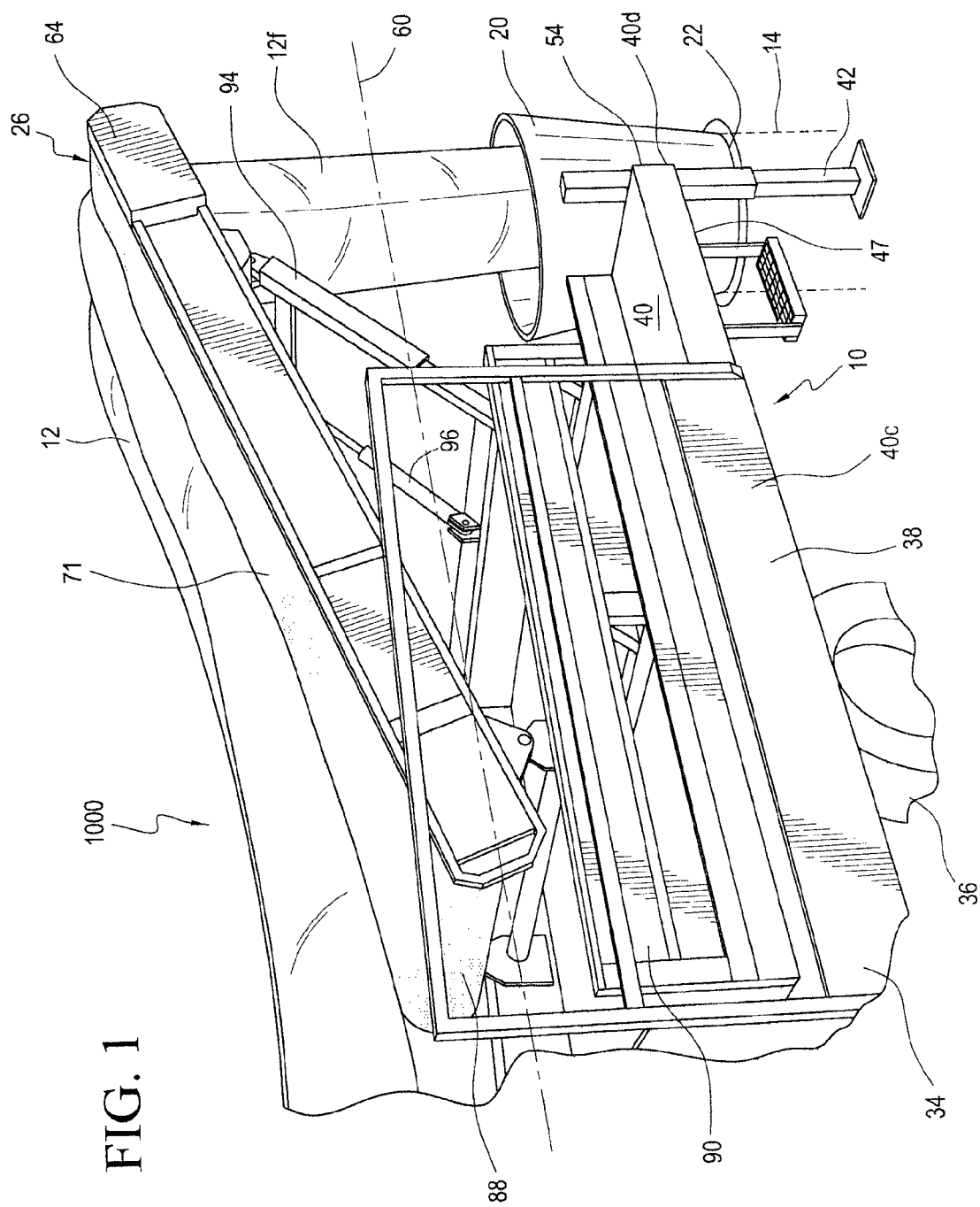
FIG. 1 is a front perspective view of the present system for the deployment of liners.
Figure 2:
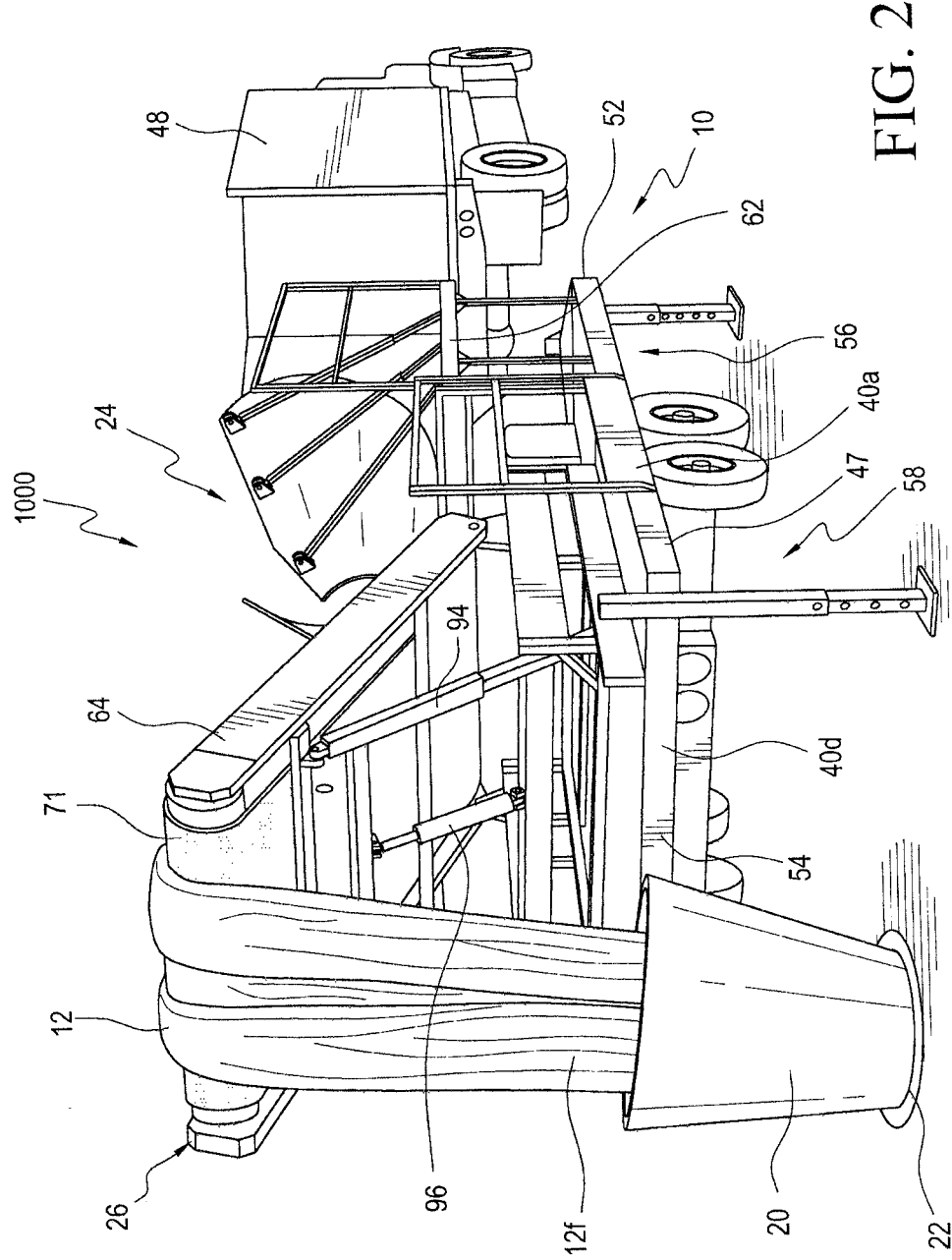
FIG. 2 is a rear perspective view of the present system for the deployment of liners.
Figure 3:
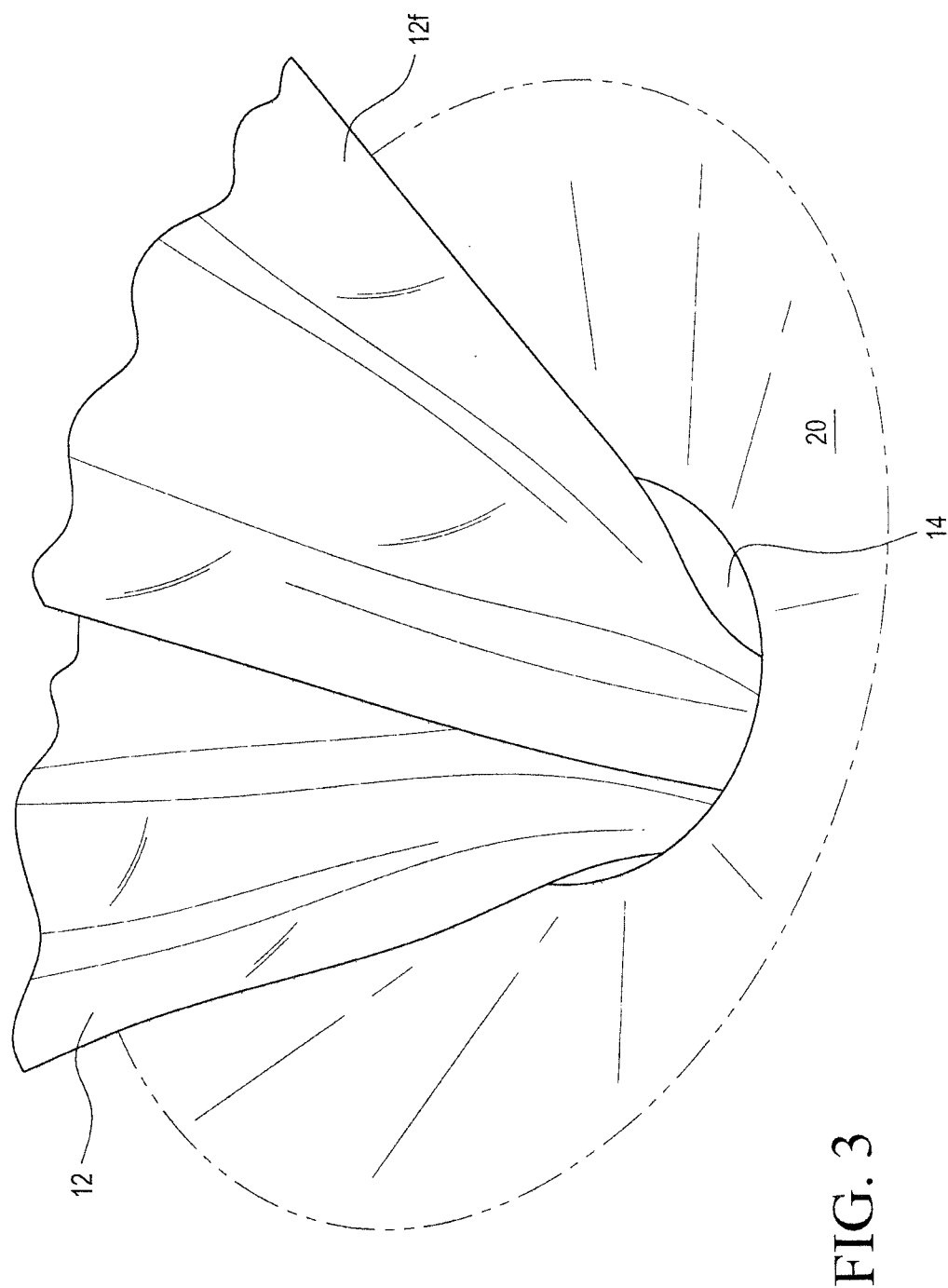
FIG. 3 shows the liner as it is being deployed within a funnel.
Figure 4:
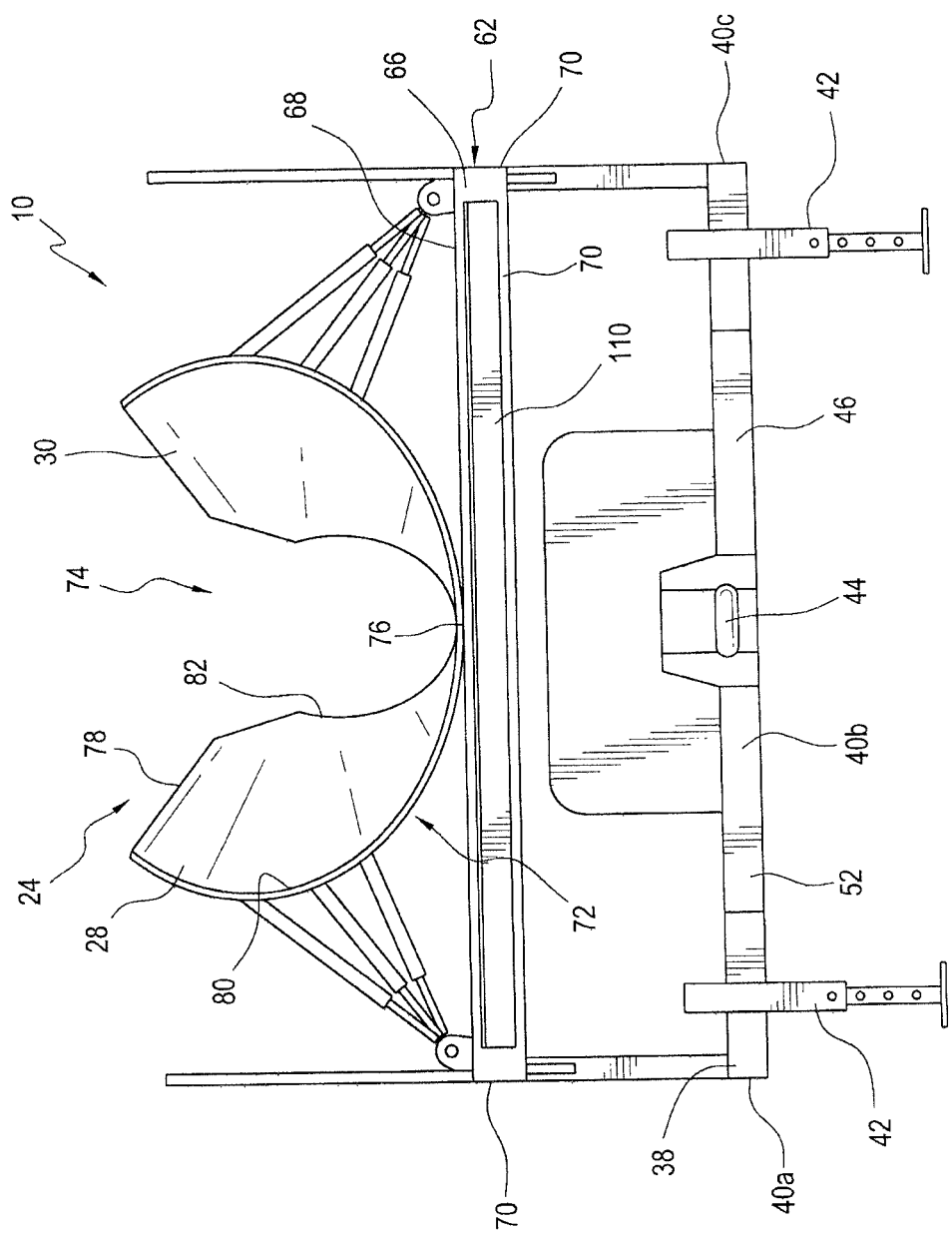
FIGS. 4-7 respectively show a front plan view, a side perspective view, a top perspective view and a side view of a mobile conveyor device.
Figure 5:
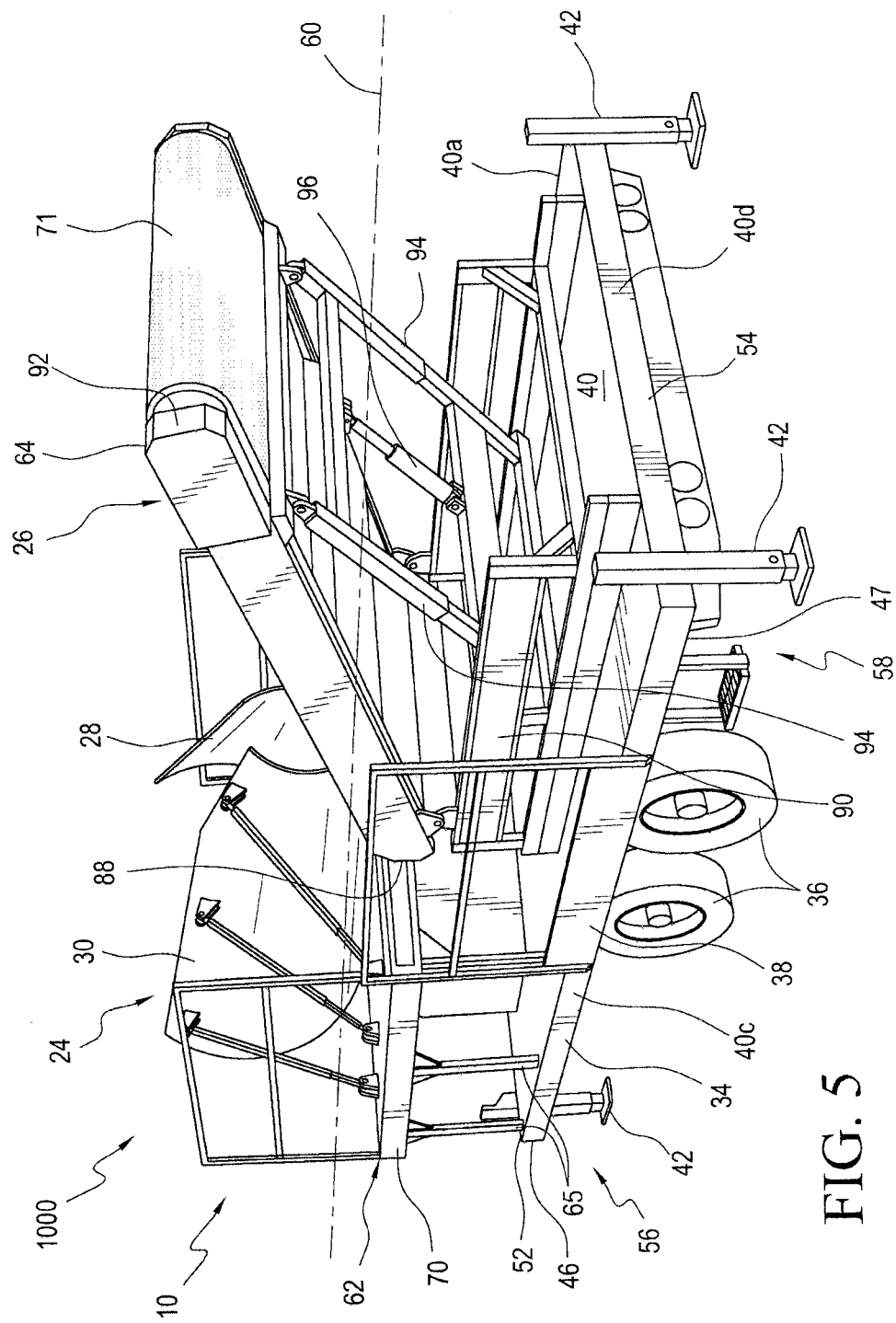
Figure 6:
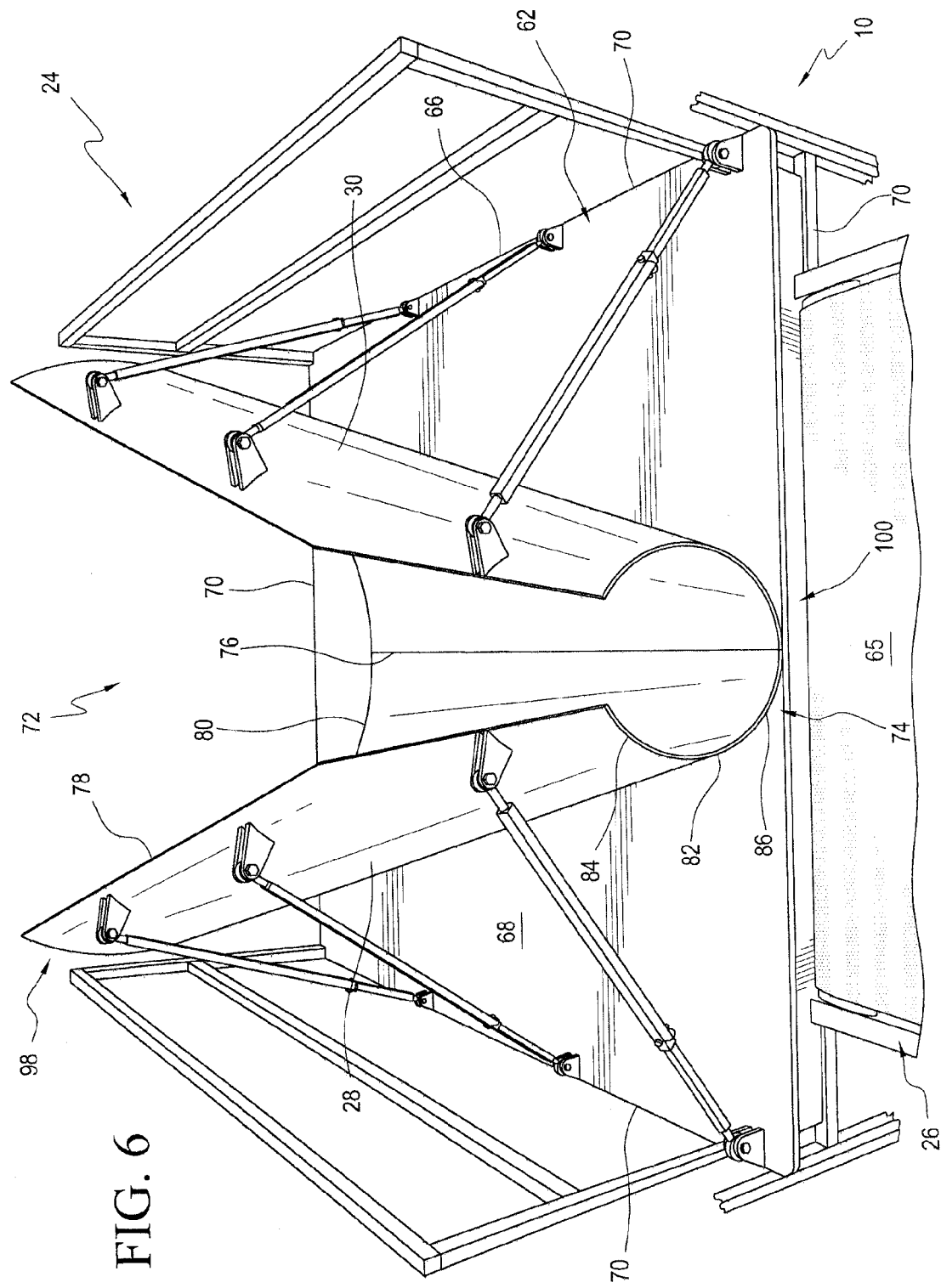
Figure 7:
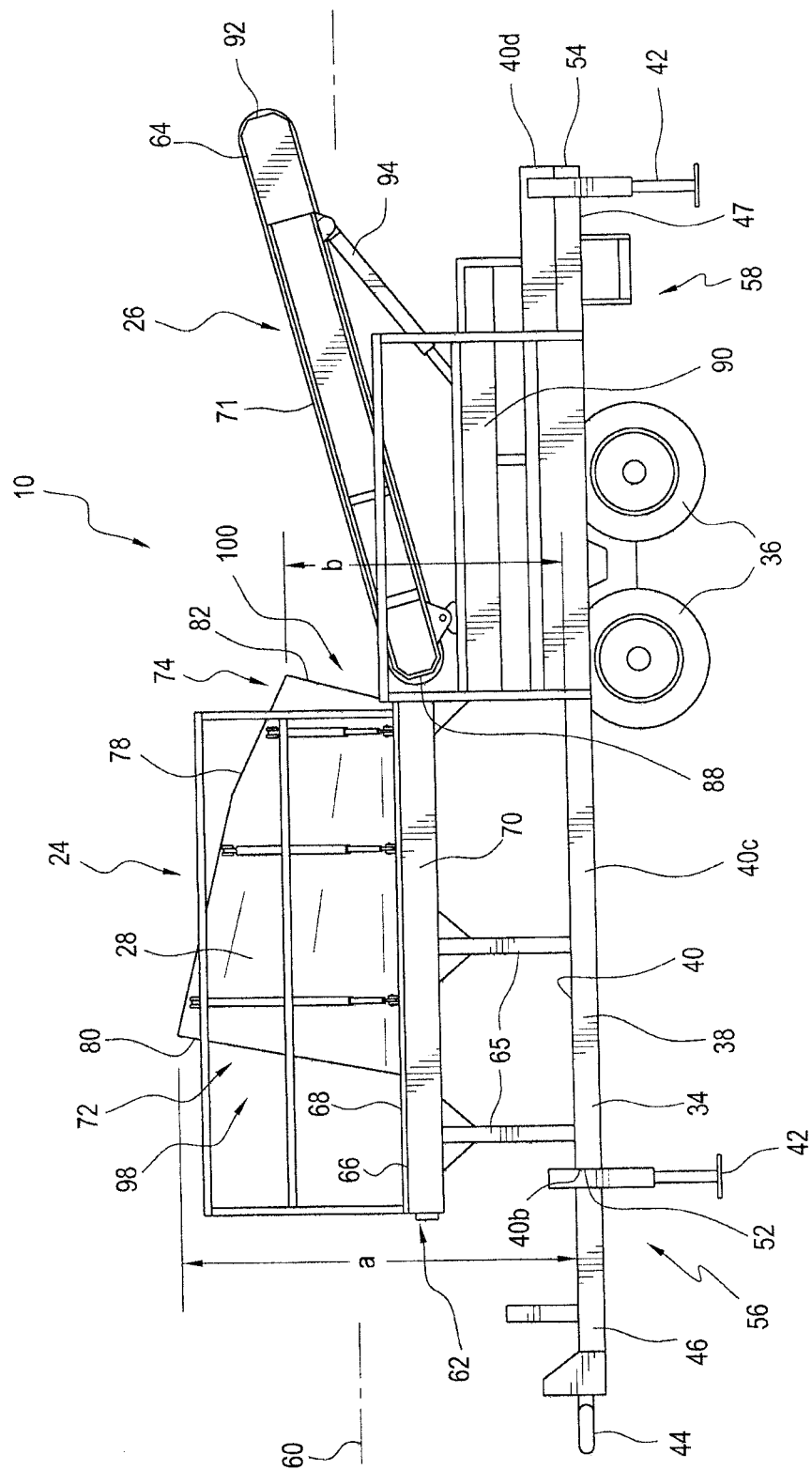
Figure 8:
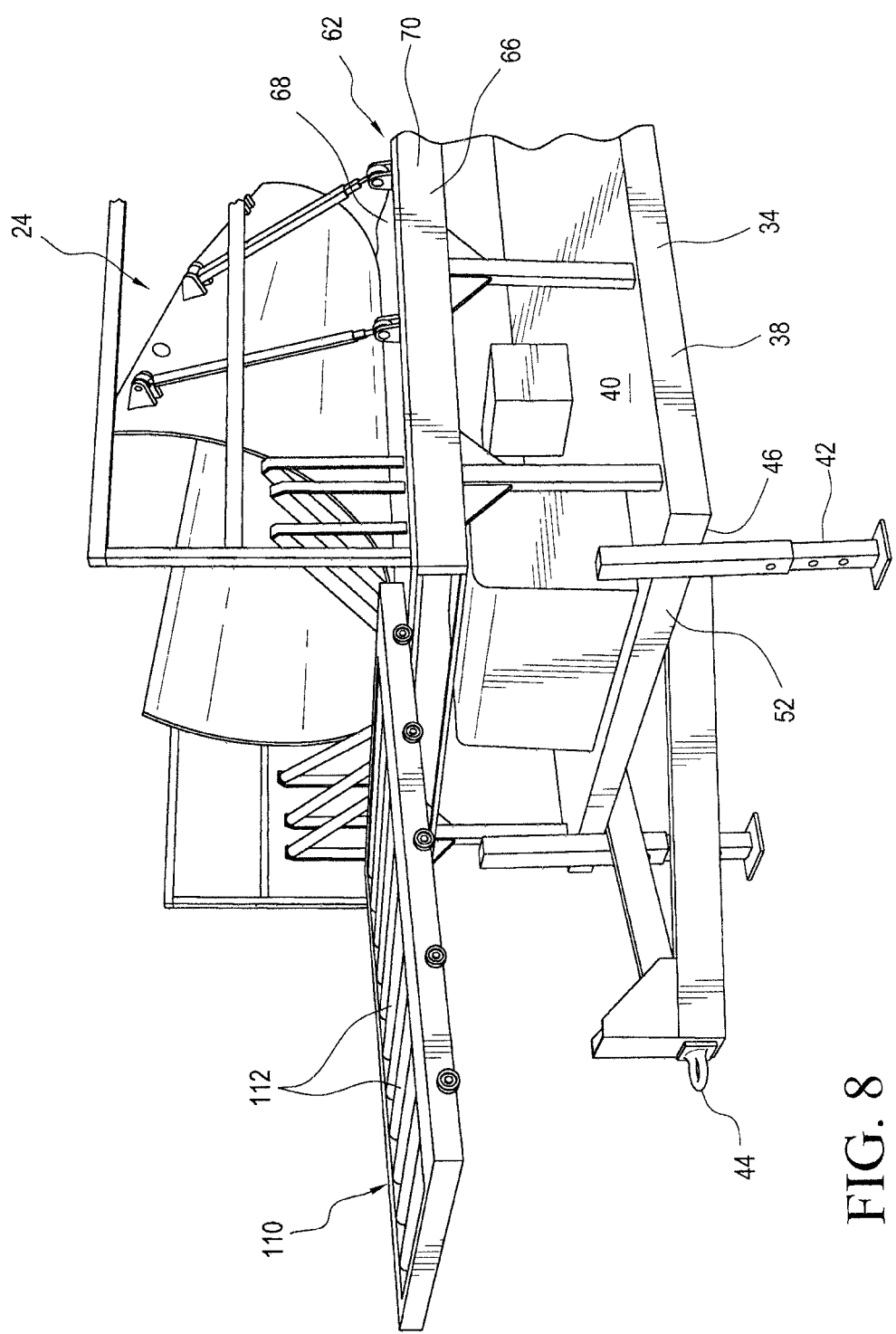
FIG. 8 is a perspective view of the mobile conveyor device with the guide member in its use orientation extended from the support platform.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 to 8, a preferred embodiment of a system 1000 employing a mobile conveyor device 10 for the deployment of liners 12 within tunnels 14 is disclosed. As will be explained below in greater detail, the system 1000 includes a mobile conveyor device 10 pulling a liner 12 from a liner crate 18 and depositing the folded liner 12f within a funnel 20 leading to the utility opening 22 and ultimately the tunnel 14. As will be explained below in greater detail, the mobile conveyor device 10 includes a folding assembly 24 and a conveyor assembly 26, although as will be appreciated based upon the following disclosure the folding assembly 24 and the conveyor assembly 26 are integrally associated. The folding assembly 24 includes first and second folding members 28, 30 shaped and dimensioned to fold the liner 12 upon itself (into thirds) prior to insertion of the liner within the utility opening 22. Once the liner 12 is folded, it is conveyed and funneled through a utility opening 22.

It should be appreciated that, in addition to the embodiment disclosed with reference to FIGS. 1 to 8, other embodiments of the present invention are disclosed below. When describing the alternate embodiments the focus is upon the differences. As such, and where the structure is the same as the embodiment disclosed with reference to FIGS. 1 to 8, the description is not repeated. It should, therefore, be presumed those structural elements are the same as that disclosed with reference to FIGS. 1 to 8.

The mobile conveyor device 10 includes a base frame 34 upon which is mounted the operational components of the mobile conveyor device 10. The base frame 34 is mobile and includes a plurality of wheels 36 supporting a support frame 38. It is appreciated the plurality of wheels 36 and support frame 38 are of a conventional construction providing the durability, stability and safety necessary for deployment of liners 12 in accordance with the present invention. With this in mind, the wheels 36 are preferably of a heavy-duty industrial construction and the support frame 38 is of a metal construction providing an upper supporting surface 40 upon which the function components are mounted. In addition, the support frame 38 is provided with a plurality of leveling members 42 at corners thereof. These leveling members 42 allow for support of the base frame 34 at a variety of locations and under various ground conditions. The leveling members 42 also add stability to the base frame 34 by expanding the landscape over which the mobile conveyor device 10 is ultimately supported. The base frame 34 also includes a hitch 44 at a first end 46 thereof for selective attachment to a transport truck or other vehicle 48 that might be used to move the present mobile conveyor device 10 from location to location.

By way of reference, the support frame 38 of the base frame 34 includes a front first end 52 and a rear second end 54, as well as an upper supporting surface 40 having four sides 40a, 40b, 40c, 40d. The four sides 40a, 40b, 40c, 40d include opposed first and second long sides 40a, 40c and opposed first and second short sides 40b, 40d. The first short side 40b is located at the front first end 46 of the base frame 34 and the second short side 40d is located at a rear second end 47 of the base frame 34. With this in mind, and as will be appreciated based upon the following disclosure, the support frame 38 of the base frame 34 may be thought of as including a front section 56 adjacent the front first end 52 of the support frame 38 and a rear section 58 adjacent the rear second end 54 of the support frame 38.

Secured to the upper supporting surface 40 of the support frame 38 are an adjustable tilting conveyor assembly 26 and a folding assembly 24. The folding assembly 24 and the conveyor assembly 26 are oriented along the long axis 60 of the support frame 38 such that a liner 12 may be first folded by the folding assembly 24 and thereafter conveyed to the tunnel 14 by the conveyor assembly 26.

In particular, the folding assembly 24 includes an elevated platform 62. The elevated platform 62 sits above the upper supporting surface 40 of the support frame 38 such that a liner 12 passing through the folding assembly 24 is properly positioned above the belt conveyor 64 of the conveyor assembly 26 for subsequent folding in accordance with the present invention. The folding assembly 24 also includes a first end 98 which is aligned with the first end 52 of the support frame 38 and a second end 100 which is positioned between the first end 52 of the support frame 38 and the second end 54 of the support frame 38.

The elevated platform 62 includes a plurality of upwardly vertically extending legs 65 upon which is mounted a platform member 66. The upwardly vertically extending legs 65 are fixedly secured to the elevated platform 62 and the platform member 66 to support the platform member 66 in a static orientation. The platform member 66 includes an upper surface 68 and four sides 70. First and second folding members 28, 30 are mounted upon the platform member 66. The first and second folding members 28, 30 are shaped and dimensioned to fold the liner 12 upon itself (into thirds) prior to insertion of the liner 12 into the utility opening 22. With this in mind, the folding assembly 24 includes the first and second folding members 28, 30. The first and second folding members 28, 30 are mirror images of each other and are mounted to the platform member 66 along their junction and on opposite sides of a central axis thereof which extends along the longitudinal axis of the support frame 38.

The first and second folding members 28, 30 are positioned to engage the unfolded liner 12 as it leaves the supply liner crate 18. The first and second folding members 28, 30 are generally wave-like, arcuate members which gradually curve upward from a generally open configuration aligned with the upper surface of the platform member 66 to a generally upright, closed and overlapping arcuate configuration. The wave-like curved configuration of the first and second folding members 28, 30 causes the liner 12 to fold over itself as it passes between the first and second folding members 28, 30.

It is appreciated the first and second folding members 28, 30 are mirror images of each other and the below description of the first folding member 28 applies equally to the second folding member 30. When viewed from the longitudinal axis of the support frame 38, the first folding member 28 includes a first end 72 adjacent the first end 52 of the support frame 38 and a second end 74 positioned remote from the first end 52 of the support frame 38 such that it is positioned between the first end 52 and the second end 54 of the support frame 38. As such, the first folding member 28 includes a lower longitudinal edge 76, an upper longitudinal edge 78, a first edge 80 at the first end 72 thereof and a second edge 82 at the second end 74 thereof.

The lower longitudinal edge 76 is shaped and dimensioned to sit upon the platform member 66. The lower longitudinal edge 76 is also shaped and dimensioned to be joined with the lower longitudinal edge 76 of the second folding member 30.

As for the first edge 80 and the second edge 82, they both extend between the lower longitudinal edge 76 and the upper longitudinal edge 78 but they exhibit different curvatures and lengths that dictate the ultimate ability of the first and second folding members 28, 30 to fold liner 12 passing therebetween. In particular, and when viewed in a plane perpendicular to the longitudinal axis of the support frame 38, the first edge 80 exhibits a radius of curvature and a length which are both larger than the radius of curvature and length of the second edge 82. As such, the first folding member 28 gradually transitions from the curvature and length of the first edge 80 to the curvature and length of the second edge 82. In doing this, the relative position of the lower longitudinal edge 76 and the upper longitudinal edge 78 changes along the length of the first folding member 28. In particular, at the first edge 80 of the first folding member 28, the upper longitudinal edge 78 is removed a distance "a" from the plane bisecting the support frame 38, and the upper longitudinal edge 78 is removed a distance "b" from the plane bisecting the support frame 38, wherein the distance "a" is greater than the distance "b". This creates a greater overlap of the upper and lower sections 84, 86 of the first folding member 28 in the area adjacent the second edge 82 thereof when compared to the overlap of the upper and lower sections 84, 86 of the first folding member 28 in the area adjacent the first edge 80.

As mentioned above, the present mobile conveyor device 10 also includes a conveyor assembly 26. The conveyor assembly 26 includes a belt conveyor 64 (preferably, a motor powered belt conveyor under the control of a control system 69) aligned with the second end 100 of the folding assembly 24 such that liner 12, which has been folded may be drawn therefrom and moved to a utility opening 22 for delivery to the tunnel 14 as is known to those skilled in the art. In particular, the belt conveyor 64 includes a first end 88 positioned adjacent the second end 100 of the folding assembly 24 wherein the second edges 82 of the first and second folding members 28, 30 complete the folding of the liner 12 passing therethough. The belt conveyor 64 also includes a second end 92, opposite the first end 88, and a belt 71 extending thereabout for continual motion under the control of a drive mechanism (not shown).

The belt conveyor 64 is supported for pivotal movement about an axis perpendicular to the longitudinal axis of the support frame 38. In particular, the first end 88 of the belt conveyor 64 is pivotally secured to the conveyor frame 90 while the second end 92 of the belt conveyor 64 is supported by an adjustment arm 94 that may be selectively moved under the control of a hydraulic drive 96 to adjust the inclination of the belt conveyor 64. In this way the horizontal position of the second end 92 of the belt conveyor 64 may be adjusted to accommodate various characteristics of the location to which the liner 12 must be delivered.

Movement of the liner 12 from the liner crate 18 to the folding assembly 24 is further facilitated by the provision of a guide member 110 at the first end 52 of the support frame 38. The guide member 110 is stored below the upper surface 68 and within the platform member 66. In this way, the guide member 110 may be retracted from its storage (and transport) orientation when its use is required (see FIG. 8). The guide member 110 includes a series of rollers 112 allowing the liner 12 to be conveniently fed into the folding assembly 24 and conveyor assembly 26. The coupled end of the guide member 110 is pivotally coupled to the platform member 66 such that the angular orientation thereof may be adjusted to suit specific working requirements. It is appreciated that a variety of mechanisms for inclination of the platform member may be employed.

Figure 9:
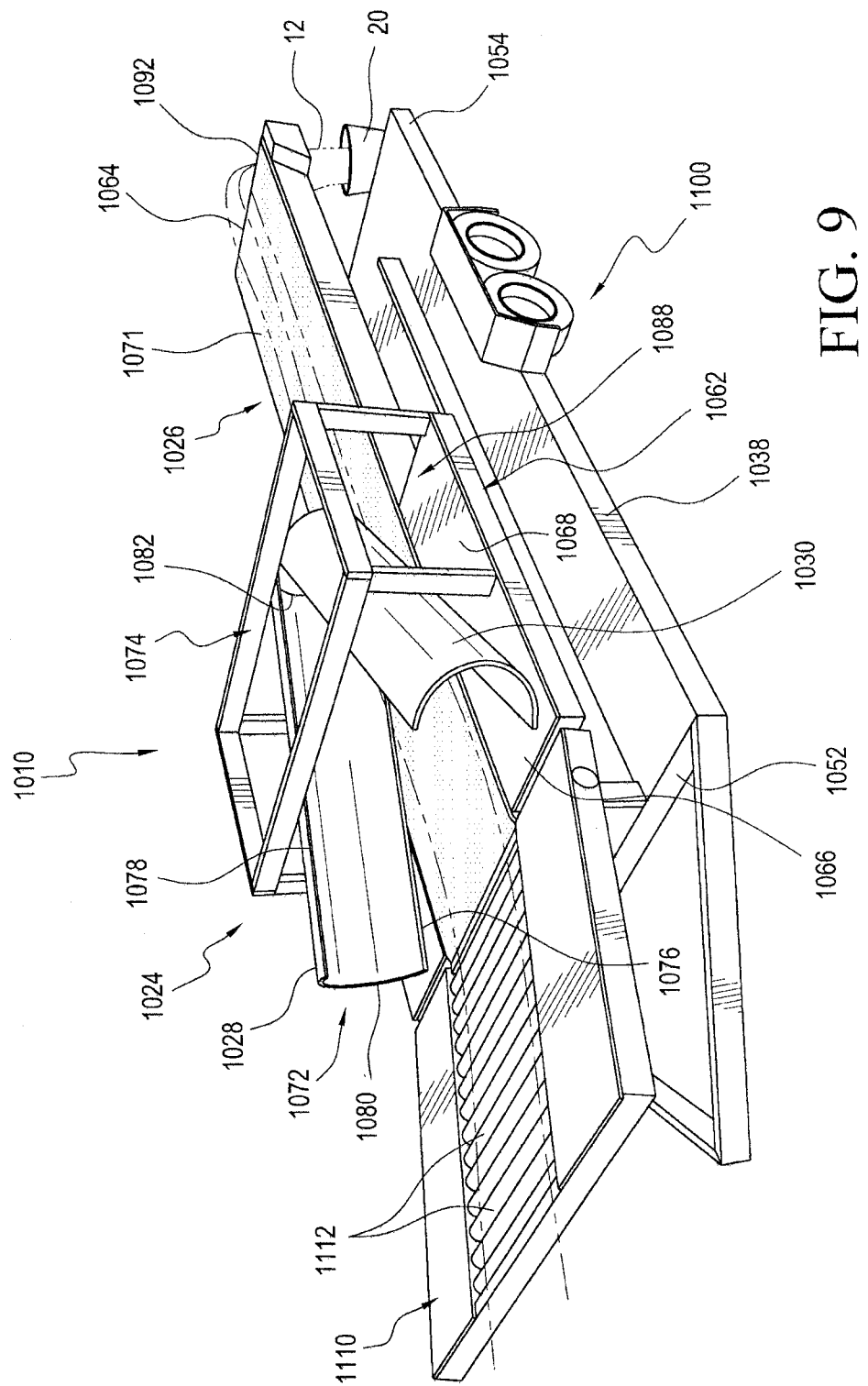
FIG. 9 is a perspective view of a mobile conveyor device in accordance with an alternate embodiment.

In accordance with an alternate embodiment as disclosed with reference to FIG. 9, the folding assembly 1024 and conveyor assembly 1026 are constructed so that the conveyor assembly 1026 forms part of the folding assembly 1024 in that the belt 1071 of the belt conveyor 1064 extends the length of the conveyor assembly 1026 and the folding assembly 1024 so as to pull the liner 12 along the entire assembly, in particular, through the first and second folding members 1028, 1030. As such, the belt 1071 extends from the second end 1092 of the belt conveyor 1064 to the side of the elevated platform 1062 opposite the conveyor assembly 1026, that is, the first end 1100 of the folding assembly 1024, such that a pulling force is applied to liner 12 from a position prior to the first and second folding members 1028, 1030 until the liner 12 is deposited into a delivery funnel 1020 and ultimately the tunnel. As with the prior embodiment, the belt conveyor 1064 is under the control of a control system (not shown).

In accordance with such an embodiment, it is appreciated the conveyor assembly 1026 still includes a first end 1088 positioned adjacent to the second end 1100 of the folding assembly 1024 and a second end 1092 from which the liner 12 is deposited, and that the belt conveyor 1064 is supported for pivotal movement about an axis perpendicular to the longitudinal axis of the support frame 1038 to allow for the adjustment of the horizontal position of the second end 1092 of the belt conveyor 1064 to accommodate various characteristics of the location to which the liner 12 must be delivered.

In addition to the provision of a belt 1071 extending the entire length of the folding assembly 1024 and the conveyor assembly 1026, this embodiment also includes a slightly different construction for the first and second folding members 1028, 1030. As with the prior embodiment, the first and second folding members 1028, 1030 are mirror images of each other and the below description of the first folding member 1028 applies equally to the second folding member 1030. When viewed from the longitudinal axis of the support frame 1038, the first folding member 1028 includes a first end 1072 adjacent the first end 1052 of the support frame 1038 and a second end 1074 positioned remote from the first end 1052 of the support frame 1038 such that it is positioned between the first end 1052 and the second end 1054 of the support frame 1038. As such, the first folding member 1028 includes a lower longitudinal edge 1076, an upper longitudinal edge 1078, a first edge 1080 at the first end 1072 thereof and a second edge 1082 at the second end 1074 thereof.

The lower longitudinal edge 1076 is shaped and dimensioned to sit upon the platform member 1066. As for the first edge 1080 and the second edge 1082, they both extend between the lower longitudinal edge 1076 and the upper longitudinal edge 1078, and the first folding member 1028 exhibits a consistent curvature as it extends from the first edge 1080 to the second edge 1082.

The first folding member 1028 also includes a longitudinal axis extending from the first edge 1080 to the second edge 1082 and the longitudinal axis is oriented at an oblique angle relative to the longitudinal axis of the belt 1071, the conveyor assembly 1064 and the remainder of the mobile conveyor device 1010. Similarly, the second folding member 1030 is oriented at an oblique angle relative to the longitudinal axis of the belt 1071, the conveyor assembly 1064 and the remainder of the mobile conveyor device 1010, but with a mirror image of the orientation of the first folding member 1028 such that both the concave surfaces of the first and second folding members 1028, 1030 face a center line of the mobile conveyor device 1010.

This embodiment is also provided with a guide member 1110 at the first end 1052 of the support frame 1038. As with the prior embodiment, the guide member 1110 is stored below the upper surface 1068 and within the platform member 1066. The guide member 1110 includes a series of rollers 1112 allowing the liner 12 to be conveniently fed into the folding assembly 1024 and conveyor assembly 1026. The guide member 1110 is pivotally coupled to the platform member 1066 such that the angular orientation thereof may be adjusted to suit specific working requirements. It is appreciated that a variety of mechanisms for inclination of the platform member may be employed.

Figure 10:
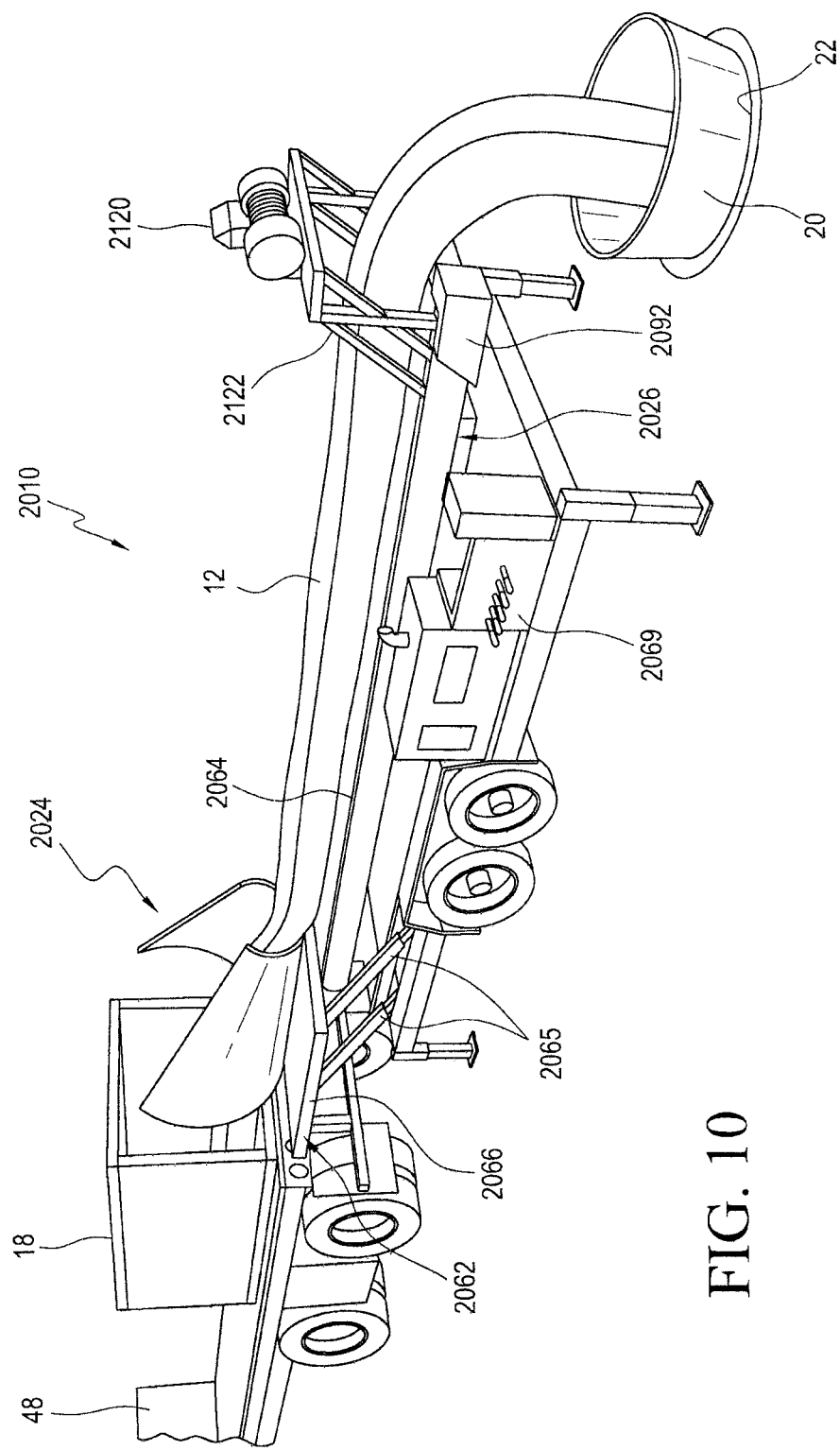
FIGS. 10 and 11 are respectively a perspective view and a side view showing an alternate embodiment with a moveable platform member.
Figure 11:
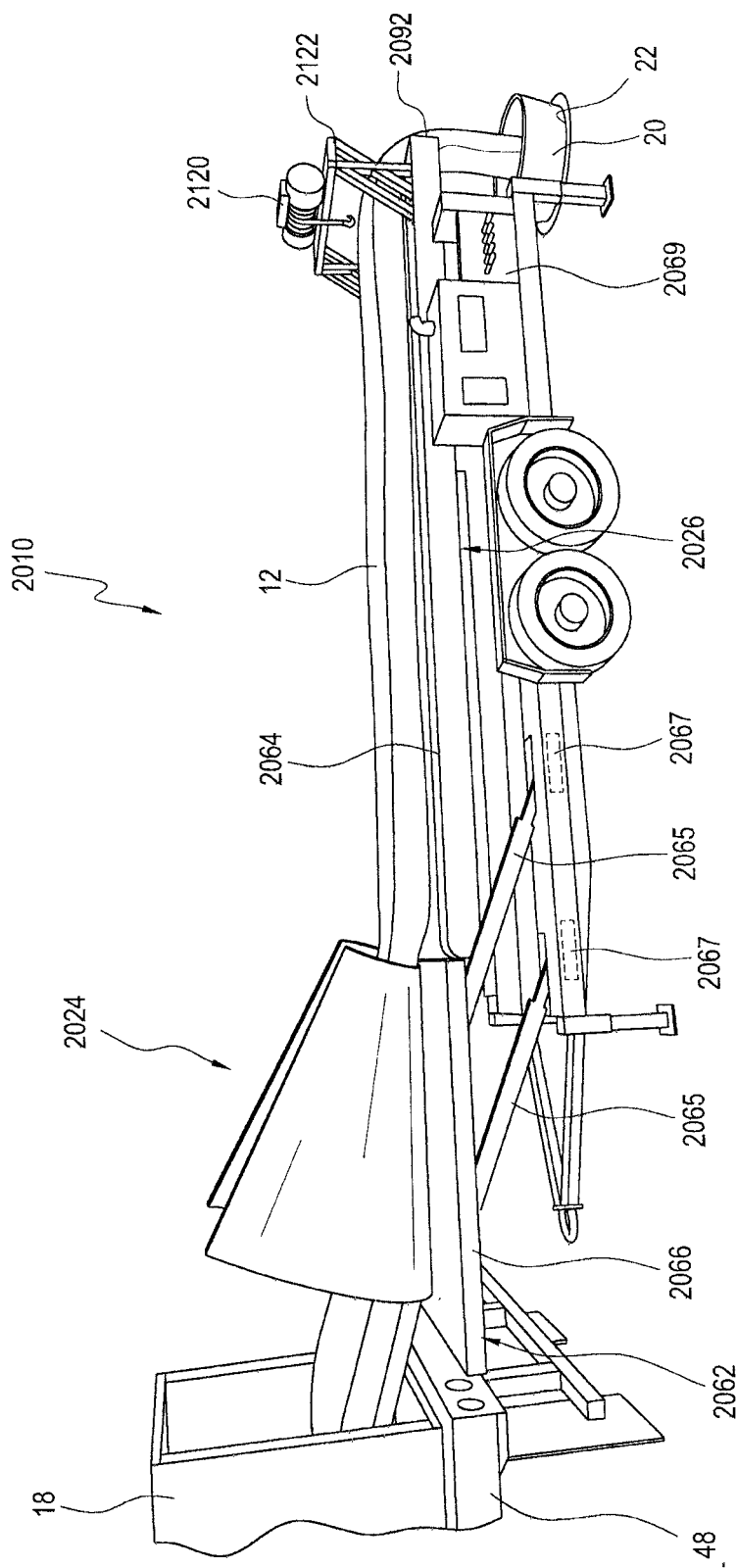
Figure 12:
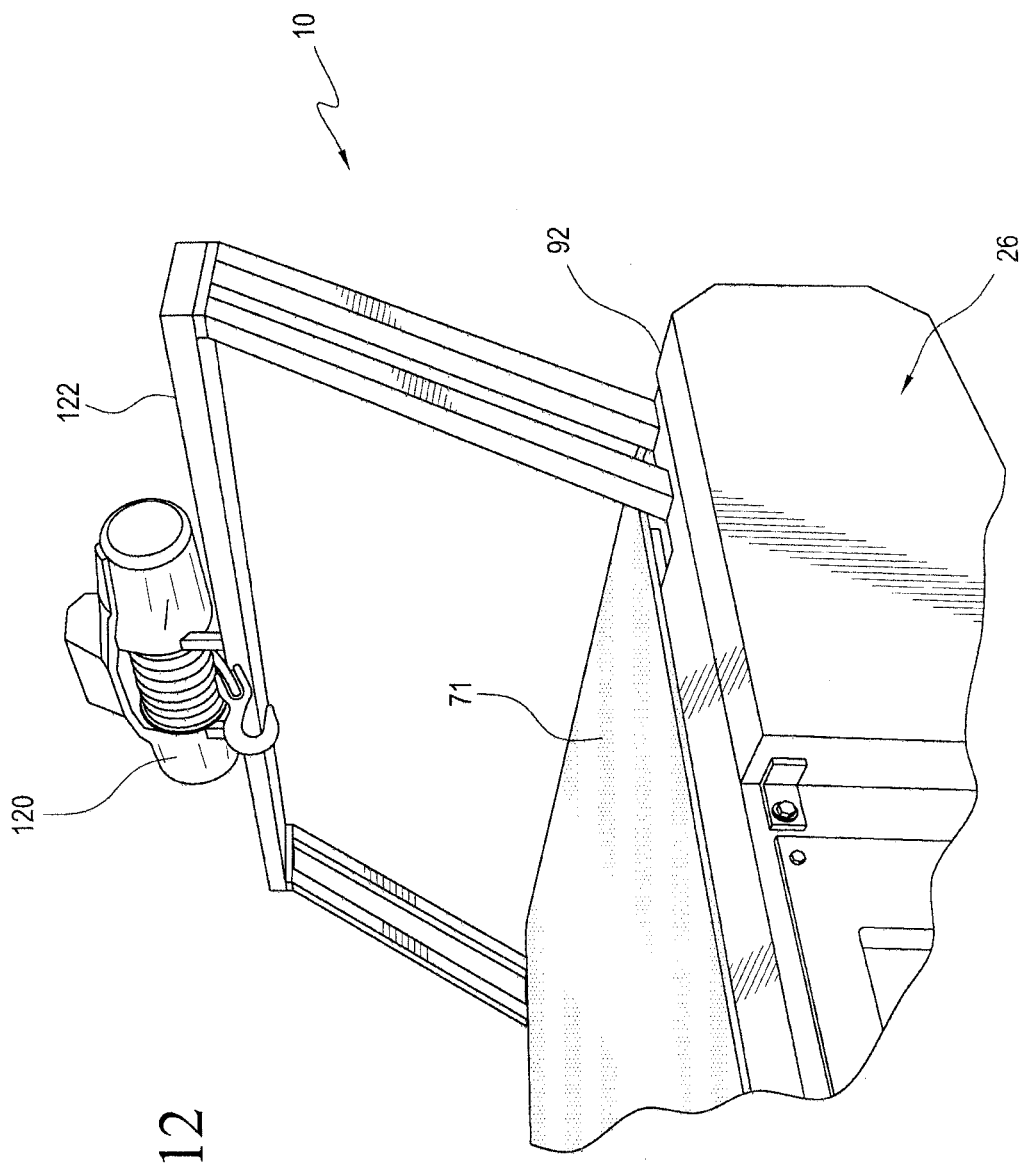
FIG. 12 shows an alternate embodiment of the mobile conveyor device of FIGS. 1 to 8 with a winch at the second end of the conveyor assembly.
Figure 13:
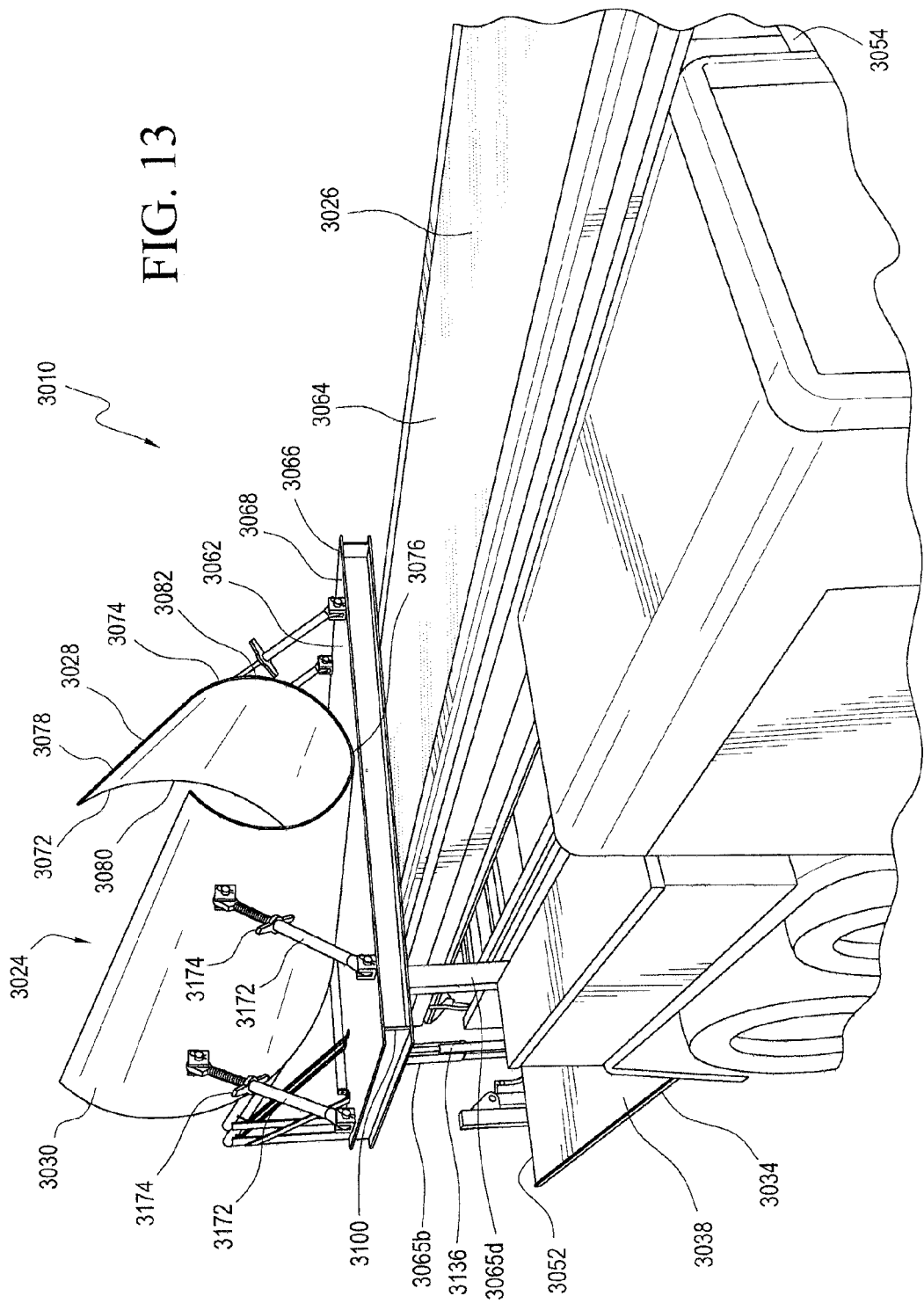
FIG. 13 is a perspective view yet another embodiment of a mobile conveyor device in accordance with the present invention.
Figure 14:
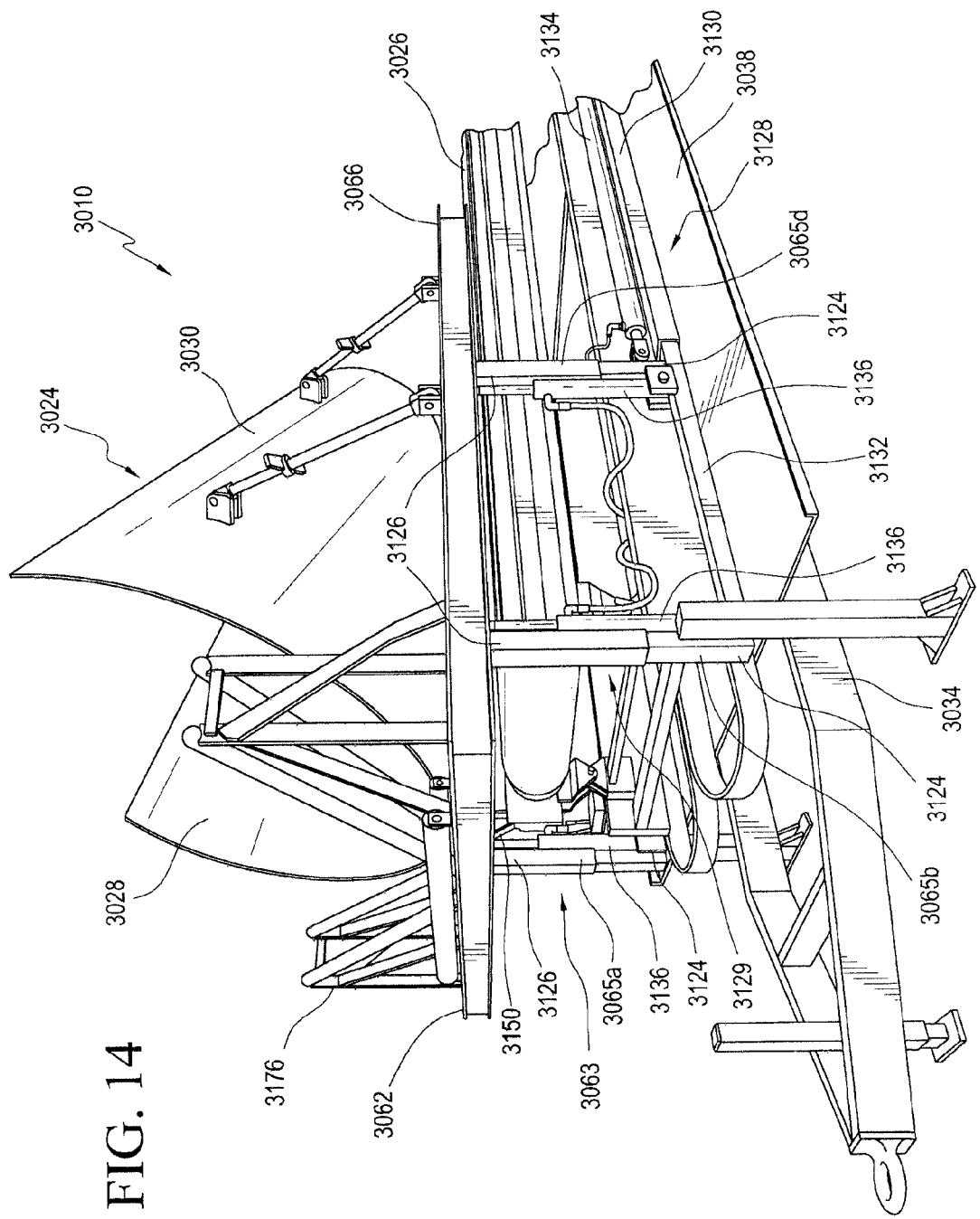
FIG. 14 is a perspective view of the embodiment shown in FIG. 13 from a different angle.
Figure 15:
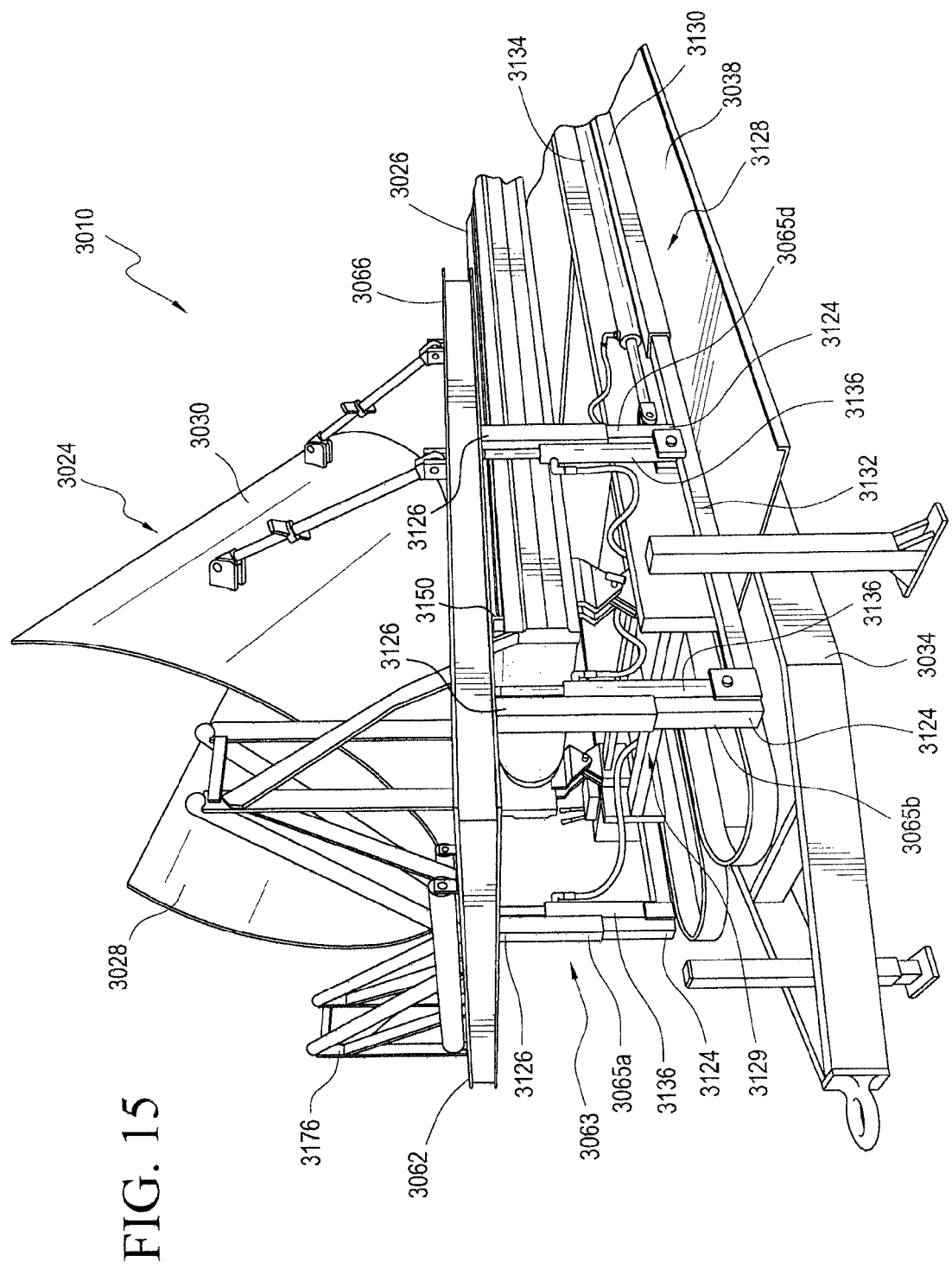
FIG. 15 is a perspective view of the embodiment shown in FIG. 13 from the angle shown in FIG. 14 but with the folding assembly slightly extended.

In accordance with yet another embodiment, and with reference to FIGS. 10 and 11, the need for a guide member may be obviated by constructing the platform member 2066 such that its position may be adjusted for controlled movement to a position closer to a truck 2048 from which the liner 2012 is being supplied. In particular, such an embodiment will allow the platform member 2066 to be supported at a position above the conveyor assembly 2026 during transport and moved during use for ideal positioning. As with the prior embodiment, the elevated platform 2062 includes a plurality of upwardly vertically extending legs 2065 upon which is mounted a platform member 2066, upon which the folding assembly 2024 is mounted. However, and in contrast to the embodiment disclosed with reference to FIGS. 1-8, the upwardly vertically extending legs 2065 are not fixedly secured to the elevated platform 2062, but are rather pivotally secured to the platform member 2066 of the elevated platform 2062. As such, the platform member 2066 is able to move in a forward and rearward manner under the control of actuators 2067 controlling the position of the legs 2065 relative to the elevated platform 2062. The actuators may be of any type capable of controlling the movement of the platform member 2066 in accordance with the present invention. As with the prior embodiments, the belt conveyor 2064 and actuators 2067 are under the control of a control system 2069.

In accordance with an alternate embodiment, and with reference to FIGS. 13 to 19, the elevated platform 3062 is moved using a linear movement system 3063. As with the prior embodiments, the belt conveyor 3064 and linear movement system 3063 are under the control of a control system 3069a, 3069b. In particular, and as with the embodiment disclosed with reference to FIGS. 10 and 11, the platform member 3066 of the elevated platform 3062 is supported by a plurality of upwardly vertically extending legs 3065a-d. Each of the upwardly vertically extending legs 3065a-d includes a first end 3124 and second end 3126, wherein the first end 3124 is secured to a linear slide assembly 3128 that selectively moves along the longitudinal axis of the base frame 3034. The second end 3126 of each of the upwardly vertically extending legs 3065a-d is secured to the platform member 3066 of the elevated platform 3062.

The linear slide assembly 3128 relies upon a telescopic assembly composed of static guide members 3130 in which support members 3132 are mounted for linear movement relative thereto under the control of hydraulic pistons 3134 acting upon the support members 3132 to cause movement thereof. While movement of the elevated platform 3062 along the longitudinal axis of the base frame 3034 is achieved via the linear slide assembly 3128, the vertical movement of the platform member 3066 of the elevated platform 3062 is achieved by constructing the upwardly vertically extending legs 3065a-d with a telescopic construction and associated hydraulic piston 3136 with each of the upwardly vertically extending legs 3065.

As discussed above with regard to the embodiment disclosed with reference to FIGS. 1 to 8, the folding assembly 24 includes an elevated platform 62. The elevated platform 62 sits above the upper supporting surface 40 of the support frame 38 such that the folding assembly 24 is properly positioned in horizontal alignment with the belt conveyor 64 of the conveyor assembly 26 for folding and subsequent conveyance of the folded liner 12f as the conveyor assembly 26 draws the liner 12 for depositing the folded liner 12f within a funnel 20 leading to the utility opening 22 and ultimately the tunnel 14. In accordance with the embodiments disclosed in FIGS. 10, 11 and 13 to 19, the folding assembly 2024, 3024 is constructed for selective movement between a storage (and transport) orientation and a use orientation. As will be appreciated based upon the following disclosure, when the folding assembly 2024, 3024 is in its storage orientation the first end 2098, 3098 thereof is aligned or adjacent with the first end 2052, 3052 of the support frame 2038, 3038 and the second end 2100, 3100 thereof is positioned between the first end 2052, 3052 of the support frame 2038, 3038 and the second end 2054, 3054 of the support frame 2038, 3038. When the folding assembly 2024, 3024 is in its use orientation the first end 2098, 3098 thereof is moved to extend beyond the first end 2052, 3052 of the support frame 2038, 3038 and the second end 2100, 3100 thereof is positioned adjacent the first end of the support frame 2038, 3038 and over the first end 2088, 3088 of the belt conveyor 2064, 3064 of the conveyor assembly 2026, 3026.

More particularly, and In accordance with the alternate embodiment disclosed with reference to FIGS. 13 to 19, the elevated platform 3062 is moved using a linear movement system 3063 composed of a linear slide assembly 3128 and a vertical lifting mechanism 3129 as will be discussed below in greater detail. In particular, as briefly described above and as with the embodiment disclosed with reference to FIGS. 10 and 11, the platform member 3066 of the elevated platform 3062 is supported by a plurality of upwardly vertically extending legs 3065a-d. Each of the upwardly vertically extending legs 3065a-d includes a first end 3124 and second end 3126, wherein the first end 3124 is secured to the linear slide assembly 3128 that selectively moves along the longitudinal axis of the base frame 3034. The second end 3126 of each of the upwardly vertically extending legs 3065a-d is secured to the platform member 3066.

The linear slide assembly 3128 relies upon a telescopic assembly composed of static guide members 3130 in which support members 3132 are mounted for linear movement relative thereto under the control of hydraulic pistons 3134, which are controlled by the control system (which is composed of control system units 3069a, 3069b), acting upon the support members 3132 to cause movement thereof. The first ends 3124 of the upwardly vertically extending legs 3065a-d are secured to the support members 3132 and consequently move under the control of the linear slide assembly 3128 as the support members 3132 are moved relative to the static guide members 3130.

In accordance with a preferred embodiment, the hydraulic pistons 3134 extend between the static guide members 3130 and the two rearward upwardly vertically extending legs 3065c, 3065d. As such, and considering the connection of the first ends 3124 of the two upwardly vertically extending legs 3065c, 3065d to the support members 3132, the lateral forces applied to the two upwardly vertically extending legs 3065 are transferred to the support members 3132 causing the support members 3132 to move relative to the static guide members 3130 for causing linear movement of the elevated platform 3062 along the length of the based frame 3034.

While movement of the elevated platform 3062 along the longitudinal axis of the base frame 3034 is achieved via the linear slide assembly 3128, the vertical movement of the platform member 3066 of the elevated platform 3062 is achieved by the vertical lifting mechanism 3129. In particular, the vertical lifting mechanism is achieved by constructing the upwardly vertically extending legs 3065 with a telescopic construction and associating a hydraulic piston 3136 with each the upwardly vertically extending legs 3065. In particular, each of the hydraulic pistons 3136 includes a first end 3140 secured to the support member 3132 and second end 3142 secured to the platform member 3066 of the elevated platform 3062. As a result, when the hydraulic pistons 3136 are actuated to either extend or retract under the control of the control system 3069, the platform member 3066 is similarly elevated or retracted.

Through the controlled manipulation of the linear slide assembly 3128 and the hydraulic pistons 3136 it is possible to move the elevated platform 3062 to a desired position relative to a truck without undue movement of the mobile conveyor device 3010. In accordance with a preferred embodiment, and considering the mobile conveyor device 3010 has been parked and it is now desired to move the elevated platform 3062 to a desired operating position, the platform member 3066 of the elevated platform 3062 is first lifted under the control of the hydraulic pistons 3136. Thereafter, the linear slide assembly 3128 is moved such that the support members 3132 are pushed toward, and beyond, the first end 3052 of the support frame 3038 to move the elevated platform 3062 beyond the first end 3052 of the support frame 3038 and expose additional portions of the conveyor assembly 3026.

Figure 18:
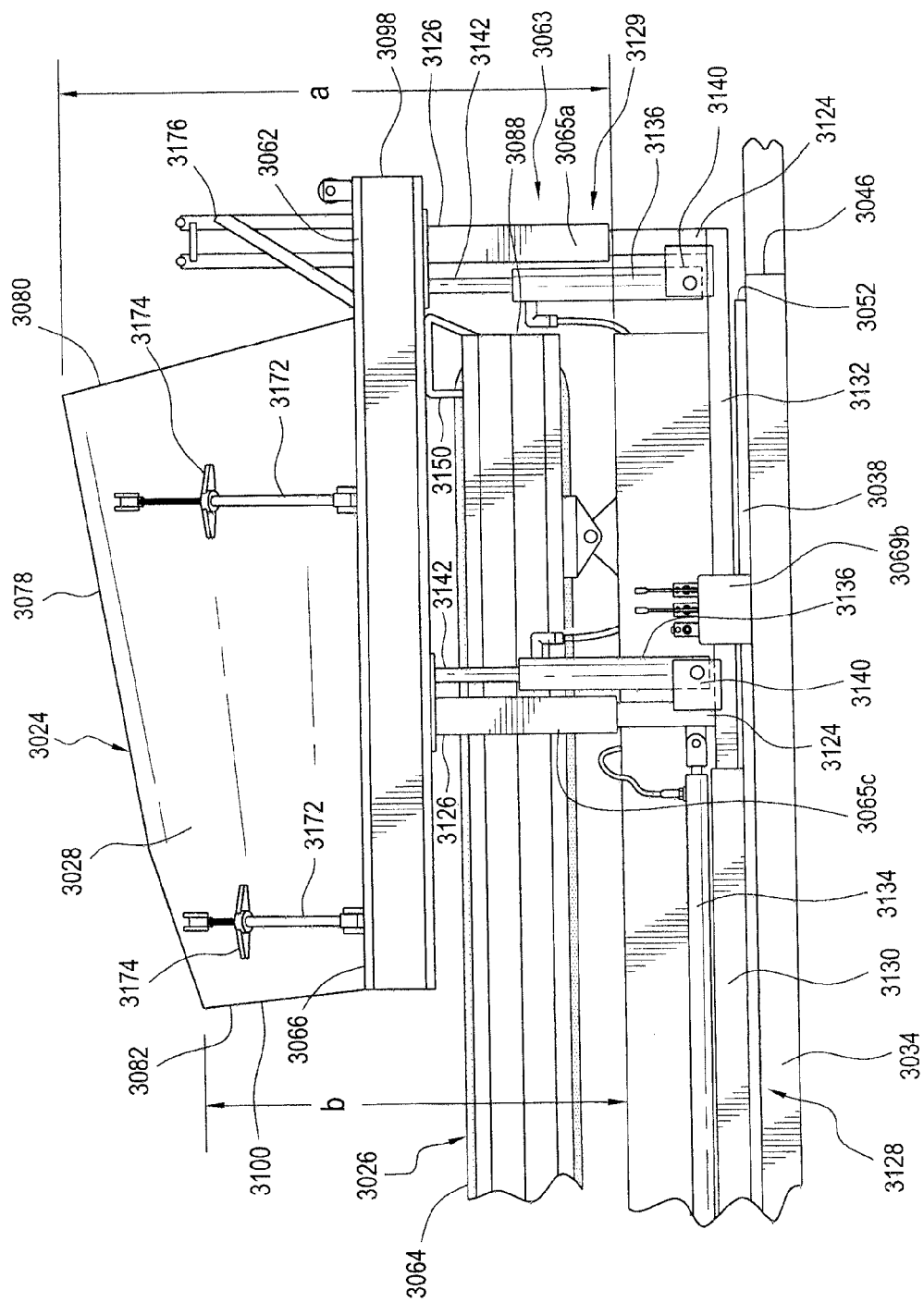
FIG. 18 is a side view of the embodiment shown in FIG. 13 when in its storage orientation.

In particular, the conveyor assembly 3026 runs the entire length of the support frame 3038, and the platform member 3066 of the elevated platform 3062 sits above a portion of the conveyor assembly 3026 when it is in its storage (and transport) orientation as shown in FIGS. 16, 17 and 18. In fact, the end 3088 of the belt conveyor 3064 is provided with support members 3150 shaped and dimensioned for positioning of the support platform 3066 of the elevated platform 3062 thereon when the elevated platform 3062 is in its storage orientation sitting over the conveyance assembly 3024 (see FIGS. 16 to 18).

Figure 19:
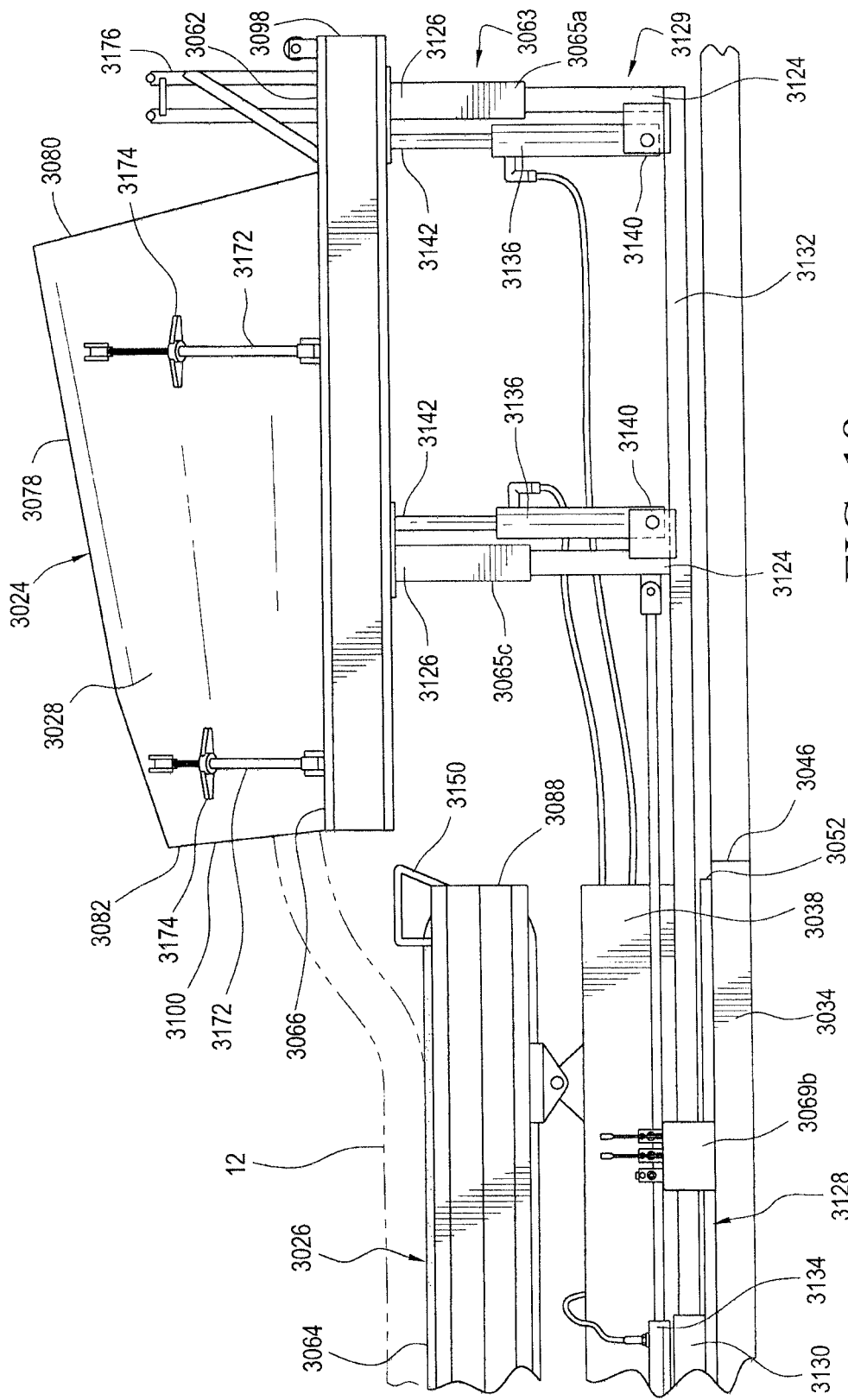
FIG. 19 is a side view of the embodiment shown in FIG. 13 when in its use orientation.

However, and when the linear slide assembly 3128 is moved such that the elevated platform 3062 is pushed toward, and beyond, the first end 3052 of the support frame 3038, more of the conveyor assembly 3026 is exposed. In fact, and in accordance with this embodiment, it is possible to move the elevated platform 3062 beyond the first end 3088 of the belt conveyor 3064 of the conveyor assembly 3026 such that the entirety of the belt conveyor 3064 is exposed. Further, the hydraulic pistons 3136 may be used to control the height of the platform member 3066 of the elevated platform 3062 such that it is positioned above, below or in horizontal alignment with the belt conveyor 3064. This is the preferred use orientation and is shown in FIG. 19. Ultimately, the more of the belt conveyor 3064 that comes into contact with the liner 12 during the installation process the more friction is created to allow for the liner 12 to be effectively pulled from the truck and directed to the pipeline tunnel for installation.

The first and second folding members 3028, 3030 of the embodiment disclosed with reference to FIGS. 13 to 19, are substantially the same as those disclosed with reference to FIGS. 1 to 8. The first and second folding members 3028, 3030 are generally wave-like, arcuate members which gradually curve upward from a generally open configuration aligned with the upper surface 3068 of the platform member 3066 to a generally upright, closed and overlapping arcuate configuration. The wave-like curved configuration of the first and second folding members 3028, 3030 causes the liner 12 to fold over as it passes between the first and second folding members 3028, 3030.

It is appreciated the first and second folding members 3028, 3030 are mirror images of each other and the below description of the first folding member 3028 applies equally to the second folding member 3030. When viewed from the longitudinal axis of the support frame 3038 and in its storage orientation, the first folding member 3028 includes a first end 3072 adjacent the first end 3052 of the support frame 3038 and a second end 3074 positioned remote from the first end 3052 of the support frame 3038 such that it is positioned between the first end 3052 and the second end 3054 of the support frame 3038. As such, the first folding member 3028 includes a lower longitudinal edge 3076, an upper longitudinal edge 3078, a first edge 3080 at the first end 3072 thereof and a second edge 3082 at the second end 3074 thereof.

The lower longitudinal edge 3076 is shaped and dimensioned to sit upon the platform member 3066 for pivotal movement relative to the platform member 3066. The lower longitudinal edge 3076 is also shaped and dimensioned to be joined with the lower longitudinal edge 3076 of the second folding member 3030 (which is similarly supported upon the platform member 3066 for pivotal movement relative to thereto). Because the first and second folding members 3028, 3030 are mounted for pivotal movement relative to the platform member 3066 their relative positions may be adjusted to optimize folding as the liner passes therebetween. This is achieved by supporting the first and second members 3028, 3030 with support bars 3172, including turnbuckles 3174, extending between the platform member 3066 and the upper longitudinal edge 3078. By adjusting the length of the support bars 3172 one can adjust the relative position of the first and second folding members 3028, 3030 as desired to optimize the folding of liners 12 as they pass therethrough.

As for the first edge 3080 and the second edge 3082, they both extend between the lower longitudinal edge 3076 and the upper longitudinal edge 3078 but they exhibit different curvatures and lengths that dictate the ultimate ability of the first and second folding members 3028, 3030 to fold liner 12 passing therebetween. In particular, and when viewed in a plane perpendicular to the longitudinal axis of the support frame 3038, the first edge 3080 exhibits a radius of curvature and a length which are both larger than the radius of curvature and length of the second edge 3082. As such, the first folding member 3028 gradually transitions from the curvature and length of the first edge 3080 to the curvature and length of the second edge 3082. In doing this, the relative position of the lower longitudinal edge 3076 and the upper longitudinal edge 3078 changes along the length of the first folding member 3028. In particular, at the first edge 3080 of the first folding member 3028, the upper longitudinal edge 3078 is removed a distance "a" from the plane bisecting the support frame 3038, and the upper longitudinal edge 3078 is removed a distance "b" from the plane bisecting the support frame 3038, wherein the distance "a" is greater than the distance "b". This creates a greater overlap of the upper and lower sections of the first folding member 3028 in the area adjacent the second edge 3082 thereof when compared to the overlap of the upper and lower sections 3084, 3086 of the first folding member 3028 in the area adjacent the first edge 3080.

Passage of the liner through the folding assembly 3024 is further enhanced by providing a V-shaped guide member 3176 upon the platform member 3066 adjacent the first end 3072 of the first and second folding members 3028, 3030.

Regardless of the embodiment of the mobile conveyor device employed (although the following disclosure references the embodiment disclosed with reference to FIGS. 1 to 8), the complete system 1000 for the delivery of the liner 12 in accordance with the present invention further includes a liner crate 18 which is supported adjacent the first end of the guide member 110 and a delivery funnel 20 which is positioned within the utility opening 22 for passage of the folded liner 12*f* therethrough. As for the liner crate 18 it is preferably supported upon a truck 48 pulling the mobile conveyor device 10. In particular, it is preferably supported at the rear 48*r* of the truck 48 at a position adjacent the first end of the guide member 110. In this way, and with reference to FIGS. 1, 2 and 3, the liner 12 may be pulled through the folding assembly 24, laid upon the belt conveyor 64 after folding and drawn forward over the second end 92 of the belt conveyor 64 where it is dropped into the funnel 20 leading to the utility opening 22 and the tunnel 14. A continuous flow of folded liner 12*f* may be provided in this manner as the conveyor assembly 26 will pull the liner 12 of the liner crate 18 through the folding assembly 24 and the folded liner 12*f* is then dropped though the funnel 20 under the control of gravity where it makes its way into the tunnel 14.

In accordance with various embodiments disclosed herein, the initial positioning of the liner 12 along the mobile conveyor device 10, 2010, 3010 that is, initially pulling the liner 12 from the liner crate 18 to the utility opening 22 such that it lies upon the conveyor assembly 26, 2026, 3026 may be achieved with the provision of a winch 120, 2120, 3120 at the second end 92, 2192, 3192 of the conveyor assembly 26, 2026, 3026 (see FIGS. 10, 11, 12, 16 and 17). A support frame 122, 2122, 3122 supports the winch 120, 2120, 3120 above the conveyor assembly 26, 2026, 3026 such that it may be attached to the liner so as to pull it from the liner crate 18 to the second end 92, 2092, 3092 of the conveyor assembly. The winch 120, 2120, 3120 may also be used for various operations with the utility opening 22 should the power offered by the winch 120, 2120, 3120 be useful.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A system for folding and deploying liners within tunnels, comprising:
a mobile conveyor device including:
a base frame including a plurality of wheels and a hitch at first end thereof, the base frame supporting a support frame having a first end adjacent the hitch and a second end;
a folding assembly including a first end and a second end, the folding assembly being mounted upon the support frame such that the first end of the folding assembly is positioned adjacent the first end of the base frame, the folding assembly including a platform member upon which are mounted first and second folding members;
a conveyor assembly including a motor powered belt conveyor, the conveyor assembly having a first end and a second wherein the conveyor assembly is mounted upon the support frame such that the first end of the conveyor assembly is positioned adjacent the second end of the folding assembly and the second end of the conveyor assembly is positioned adjacent the second end of the base frame; and
a winch at the second end of the conveyor assembly, the winch being adapted for attachment to the liner so as to pull it from a liner crate to the second end of the conveyor assembly.

2. A system for folding and deploying liners within tunnels, comprising:
a mobile conveyor device including:
a base frame including a plurality of wheels and a hitch at first end thereof, the base frame supporting a support frame having a first end adjacent the hitch and a second end;
a folding assembly including a first end and a second end, the folding assembly being mounted upon the support frame such that the first end of the folding assembly is positioned adjacent the first end of the base frame, the folding assembly including a platform member upon which are mounted first and second folding members; and
a conveyor assembly consisting essentially of a motor powered belt conveyor having a first end and a second wherein the motor powered belt conveyor is mounted upon the support frame such that the first end of the motor powered belt conveyor is positioned adjacent the second end of the folding assembly and the second end of the motor powered belt conveyor is positioned adjacent the second end of the base frame.

* * * * *